United States Patent [19]
Nakano et al.

[11] Patent Number: 5,772,191
[45] Date of Patent: Jun. 30, 1998

[54] SPRING ASSEMBLY FOR AUTOMATIC TRANSMISSION OF AUTOMOTIVE VEHICLE AND THE LIKE

[75] Inventors: Yoshinori Nakano; Tetsuya Taniguti, both of Aichi-ken, Japan

[73] Assignee: Togo Seisakusyo Corporation, Aichi-ken, Japan

[21] Appl. No.: 760,419

[22] Filed: Dec. 4, 1996

Related U.S. Application Data

[63] Continuation of Ser. No. 322,084, Oct. 12, 1994, abandoned, which is a continuation of Ser. No. 967,229, Oct. 27, 1992, abandoned.

[30] Foreign Application Priority Data

Oct. 30, 1991 [JP] Japan ................................. 3-314121
Aug. 21, 1992 [JP] Japan ................................. 4-245822

[51] Int. Cl.⁶ .................... B60G 11/14; F16F 1/04
[52] U.S. Cl. .......................................... 267/287; 207/179
[58] Field of Search .............................. 207/216, 248, 207/249, 250, 289, 291, 170, 174, 179, 91, 28, 33; 192/89.26, 70.27

[56] References Cited

U.S. PATENT DOCUMENTS

| | | | |
|---|---|---|---|
| 1,205,603 | 11/1916 | Dottl | 267/289 X |
| 1,937,854 | 12/1933 | Stratton | 267/289 X |
| 2,104,962 | 1/1938 | Anderson | 192/89 CP |
| 2,495,920 | 1/1950 | Dentler | 267/216 |
| 2,690,845 | 10/1954 | Macomber | 267/289 X |
| 3,394,788 | 7/1968 | Sink | 192/89 CP |
| 3,489,255 | 1/1970 | Gatewood | 192/89.26 |
| 3,782,708 | 1/1974 | Dalude et al. | 192/89 CP X |
| 4,936,432 | 6/1990 | Flotow | 192/89.26 |
| 5,007,514 | 4/1991 | Hattori et al. | 188/82.84 X |
| 5,073,156 | 12/1991 | Garrett et al. | 475/56 |

FOREIGN PATENT DOCUMENTS

| | | |
|---|---|---|
| 2373728 | 7/1978 | France . |
| 3323861 | 1/1985 | Germany . |
| 4019072 | 12/1990 | Germany . |
| 130393 | 8/1919 | United Kingdom . |

*Primary Examiner*—Lee W. Young
*Attorney, Agent, or Firm*—Graham & James LLP

[57] ABSTRACT

A spring assembly for an automatic transmission of automobiles includes a generally ring-shaped spring retainer formed from a synthetic resin material, a plurality of mounting protrusions circumferentially formed on a peripheral face of the spring retainer, and a plurality of coil springs having one ends mounted on the mounting protrusions respectively. Alternatively, the spring assembly includes a pair of generally ring-shaped spring retainers each formed from a synthetic resin material, a plurality of mounting protrusions circumferentially formed on each spring retainer, a plurality of guide protrusions circumferentially formed on each spring retainer so as to be positioned between each mounting protrusion and the adjacent one, and a plurality of coil springs having one ends mounted on the mounting protrusions of either spring retainer and the other ends fitted to the guide protrusions of the other spring retainer respectively.

5 Claims, 13 Drawing Sheets

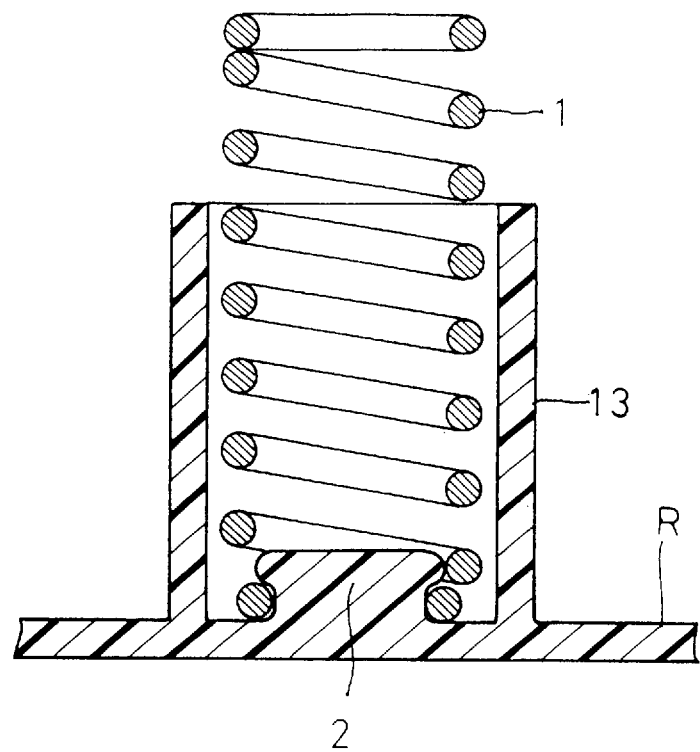
F I G 1 2

SPRING ASSEMBLY FOR AUTOMATIC TRANSMISSION OF AUTOMOTIVE VEHICLE AND THE LIKE

This is a continuation of application Ser. No. 08/322,084 filed on Oct. 12, 1994, now abandoned, which is a continuation of Ser. No. 07/967,229, filed on Oct. 27, 1992, now abandoned.

BACKGROUND OF THE INVENTION

1. Field of the Invention

This invention relates to a spring assembly incorporated in automatic transmission of automotive vehicles and the like, and more particularly to such a spring assembly wherein spring retainers which will be referred to as "retainers" hereafter are formed from a synthetic resin material.

2. Description of the Prior Art

An automatic transmission of an automobile is generally provided with a hydraulic piston mechanism for engaging and disengaging a clutch. A spring assembly is mounted on an input shaft for the mechanical return of the piston mechanism. For example, a plurality of coil springs are mounted on a single retainer or between a pair of retainers in the known construction of such a spring assembly incorporated an the automatic transmission of the automobile. The known spring assembly is generally called "clutch piston-return spring" which will be referred to as "clutch type." Conventionally, the spring assembly used in the clutch type has usually comprised of a retainer formed from a metal material into a ring shape and a plurality of coil springs disposed annularly so that the springs are directly engaged with an counterpart. Recently, however, increasing number of the type in which the springs are held at both ends between two retainers has been used for the convenience of its treating.

Conventionally, burring holes are previously formed in the peripheral face of the retainer when the coil springs are mounted on the retainer. One ends of the springs are fit into the respective burring holes and subsequently, burring cylinders are caulked in the respective holes so that the springs can be prevented from falling out the respective holes.

However, the following problems result from the conventional spring assembly in which the retainer is formed from the metal material. The number of the coil springs used in the spring assembly depends upon a required spring force. When a strong spring force is required, the wire diameter of each coil spring is increased and its coil diameter is reduced. That is, the outer diameter of each burring cylinder needs to be reduced so that as many burring cylinders as possible are provided on the retainer. On the other hand, the thickness of the retainer is increased as the required spring force is increased. It is not easy to caulk the burring cylinders with a small diameter on the thickened retainer. Accordingly, the thickness of the retainer and the number of the burring cylinders cannot be set unrestrictedly in the conventional spring assembly, which reduces freedom in designing.

Further, another type of the spring assembly is incorporated in a reduction gear mechanism of the automobile. The spring assembly incorporated in the reduction gear mechanism is usually called "brake piston-return spring" which will be referred to as "brake type." A retainer used in the spring assembly of the brake type generally has the construction as shown in FIG. 16. The retainer R' is formed generally into the shape of a ring and has four brackets 20 integrally formed on its peripheral edge. Each bracket 20 has three mounting portions 21 on which the coil springs not shown in FIG. 16 are mounted respectively and then, the spring assembly is incorporated into the reduction gear mechanism so that the coil springs thus mounted on the retainer are engaged with the counterpart.

In the spring assembly of both above-described types, the retainer is required to have no burrs. For this purpose, a barrel polishing is performed for removal of the burrs from the retainer after the burring. However, the barrel polishing results in the problem of warp in the retainer and in particular, that of the brake type. The reason for this is that the retainer of the brake type has a diameter larger and a rigidity lower than that of the clutch type. Consequently, a step of remedying the warp needs to be applied to the retainer of the brake type, which increases in the number of assembly steps and lowers the manufacturing efficiency.

The spring assembly has another problem of a relative angular displacement or distortion caused between the pair of retainers of the clutch type wherein the coil springs are held between the retainers. A measure needs to be taken against the distortion of the retainers.

Furthermore, the spring assemblies are usually exclusive parts differing from one type of automobile to another type. Some identification marks need to be put on the spring assemblies in an assembly line. The coil springs are usually sprayed with color paints for this purpose. However, the painting work is troublesome and the paint film applied to the coil springs is easy to peel off and the paint film having peeled off the coil springs lowers the purity of a lubrication oil of the hydraulic system, clogging a hydraulic valve.

SUMMARY OF THE INVENTION

Therefore, an object of the present invention is to provide a spring assembly which can be manufactured at a high manufacturing efficiency and provide an improved degree of freedom in manufacturing the retainers.

Another object of the invention is to provide a spring assembly provided with distortion preventing means which can be readily formed.

In one aspect, the present invention provides a spring assembly comprising a generally ring-shaped spring retainer formed from a synthetic resin material, a plurality of mounting protrusions circumferentially formed on a peripheral face of the spring retainer, and a plurality of coil springs having one ends mounted on the mounting protrusions respectively.

In another aspect, the present invention provides a spring assembly comprising a pair of generally ring-shaped spring retainers each formed from a synthetic resin material, a plurality of mounting protrusions circumferentially formed on each spring retainer, a plurality of guide protrusions circumferentially formed on each spring retainer so as to be positioned between each mounting protrusion and the adjacent one, and a plurality of coil springs having one ends mounted on the mounting protrusions of either spring retainer and the other ends fitted to the guide protrusions of the other spring retainer respectively.

It is preferable that walls be formed on the face of one or each spring retainer so as to surround the mounting protrusions respectively.

It is also preferable that each mounting protrusion be formed into a generally cylindrical shape and the end of each coil spring can be press fitted to outer periphery of each mounting protrusion.

In accordance with the above-described construction, limitations to the manufacture of the spring assembly can be reduced and the degree of freedom in designing the spring assembly can be improved as compared with the prior art since the retainers are formed from the synthetic resin material. Further, the manufacturing efficiency can be improved since the step of removing the burrs is eliminated. Since the retainers can be formed from a colored resin, the retainers need not be sprayed with the colored paints for identification of their types.

When the walls are formed on the retainers so as to surround the respective mounting portions, not only the retainers can be reinforced, but the distortion of the coil springs can be prevented. Consequently, the seating state of each coil spring can be rendered stable. Further, the coil spring can be press fitted to the respective mounting portions so as to be elastically fixed in position when the mounting portions are formed into the cylindrical shape. Consequently, the coil spring mounting work can be improved in the efficiency.

The other objects of the invention will become obvious upon understanding of the illustrative embodiments about to be described. Various advantages not referred to herein will occur to those skilled in the art upon employment of the invention in practice.

BRIEF DESCRIPTION OF THE DRAWINGS

Embodiments of the present invention will be described wit reference to the accompanying drawings in which:

FIG. 12 is a partially perspective view of one of coil springs surrounded by a wall in the spring assembly of an eleventh embodiment;

DESCRIPTION OF THE PREFERRED EMBODIMENTS

First Embodiment

Figure 1:
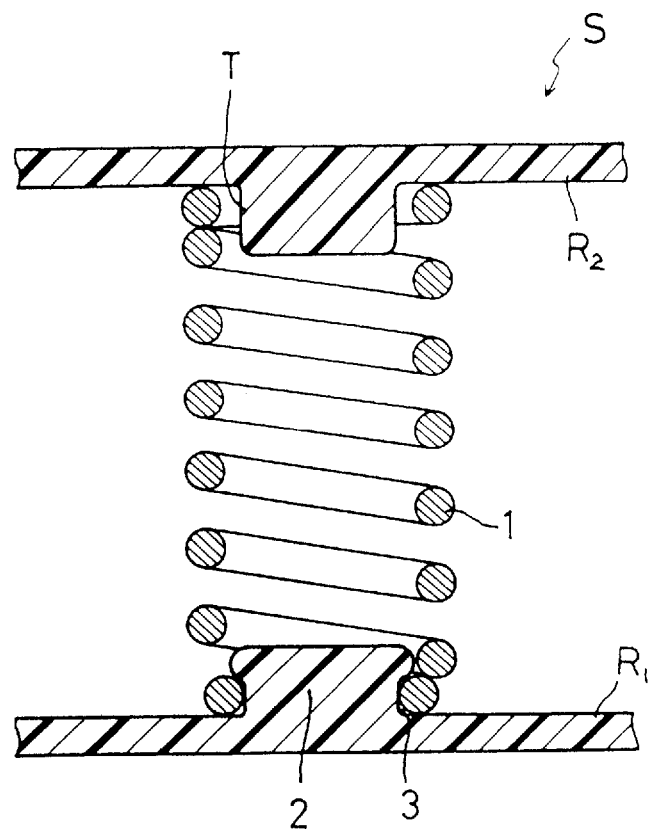
FIG. 1 is a partially sectional view of one of coil springs disposed between the spring retainers in the spring assembly of a first embodiment of the invention.
Figure 2:
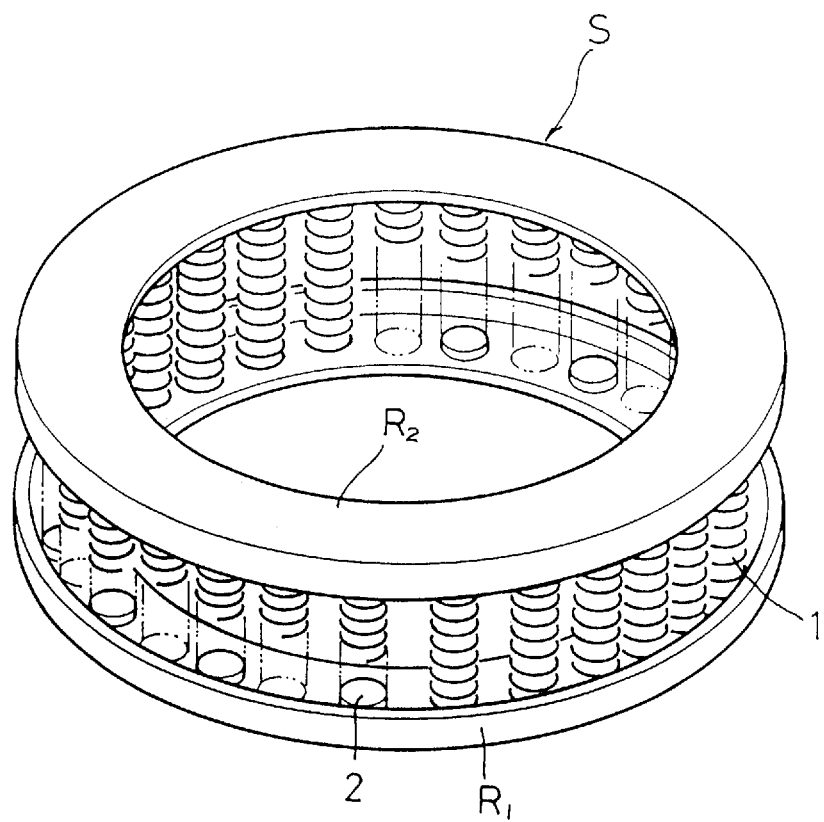
FIG. 2 is a perspective view of the spring assembly.

A first embodiment of the present invention will now be described with reference to FIGS. 1 and 2. The invention is applied to a spring assembly S of the clutch type in the first embodiment. The spring assembly S comprises first and second retainers R1 and R2 and a plurality of coil springs 1 held between the retainers R1, R2.

Both retainers R1, R2 are integrally formed from a synthetic resin material such as reinforced plastics into a ring shape and have the same diameter. A plurality of mounting portions 2 are provided at equal angular intervals on the peripheral face of each of the retainers R1, R2. The mounting portions 2 are integrally formed so as to project from the peripheral faces of the retainers R1, R2 respectively and so as to generally have a circularly trapezoidal shape. Each mounting port ion 2 has a constricted or narrow portion 3 formed at its root along the periphery. The constricted portions 3 prevent the coil springs from falling out of the respective mounting portions 2. The constricted portions 3 are formed by heat caulking the mounting portions 2. The constricted portions 3 may or may not be provided. The coil springs 1 can be press fitted to the respective mounting portions 2 to be fixed in position when the constricted portions 3 are not provided.

The mounting portions 2 of the retainer R1 and those of the retainer R2 are out of phase such that the mounting portions 2 protrude alternately from the retainers R1, R2. Accordingly, when the retainers R1, R2 are combined with each other, one ends of the coil springs 1 are fitted to the mounting portions 2 respectively and the other ends of the coil springs 1 whose opposite ends are fitted to the respective mounting portions 2 of either retainer are loosely fitted to guide protrusions T formed on the other retainer respectively. Consequently, perpendicularity of the coil springs 1 to the retainers can be maintained and the buckling of the coil springs 1 can be prevented.

The spring assembly S constructed as described above is incorporated in the automatic transmission mechanism in the condition that a predetermined load is applied to the coil springs 1 or the coil springs 1 are compressed. In operation, the spring assembly S is displaced by compression and return of the coil springs 1.

In accordance with the first embodiment described above, the mounting portions 2 are formed concurrently with the forming of the retainers R1, R2. Thus, the retainers R1, R2 can be efficiently manufactured since the step for removal of burrs, which step is required in the prior art, is not required. Further, the height and the outer diameter of each mounting portion 2 and the like can be set irrespective of the thickness of the retainers since the retainers are molded out of the synthetic resin material. Consequently, the degree of freedom in the design of the spring assembly can be improved. Additionally, the retainers can be readily formed into a shape even where it is difficult to obtain the shape by the metal working. Consequently, the limitations to the forming of the spring assembly can be remarkably reduced.

In the case where either one or both of the retainers R1, R2 have one or more through-apertures, the lubricating oil sometimes leaks through the apertures depending upon the structure of the transmission mechanism in which the spring assembly is incorporated. Thus, the through-apertures are not sometimes allowed to be formed in the spring assembly. In this case, both ends of the coil springs only abut against the respective retainers in the prior art, which renders the coil springs unstable. In the above-described embodiment, however, the spring assembly S can be applied to various types of automatic transmission mechanism and the like since the retainers R1, R2 are not provided with any through-apertures such as the burring apertures.

Furthermore, each of the retainers R1, R2 can be formed from a colored resin and various kinds of colors can be used in accordance with the types of the spring assembly. Thus, the spring assemblies need not be sprayed with different color paints so that the identification marks are formed on the spring assemblies. Consequently, the anxiety about the peeling of the paint film can be eliminated and the lubricating oil can be prevented from lowering its cleanness by the paint film. Moreover, the identification of the types of spring assemblies in the assembly line can be improved and a false incorporation of the spring assembly into the transmission mechanism and the like can be prevented from occurring.

Second Embodiment

Figure 3:
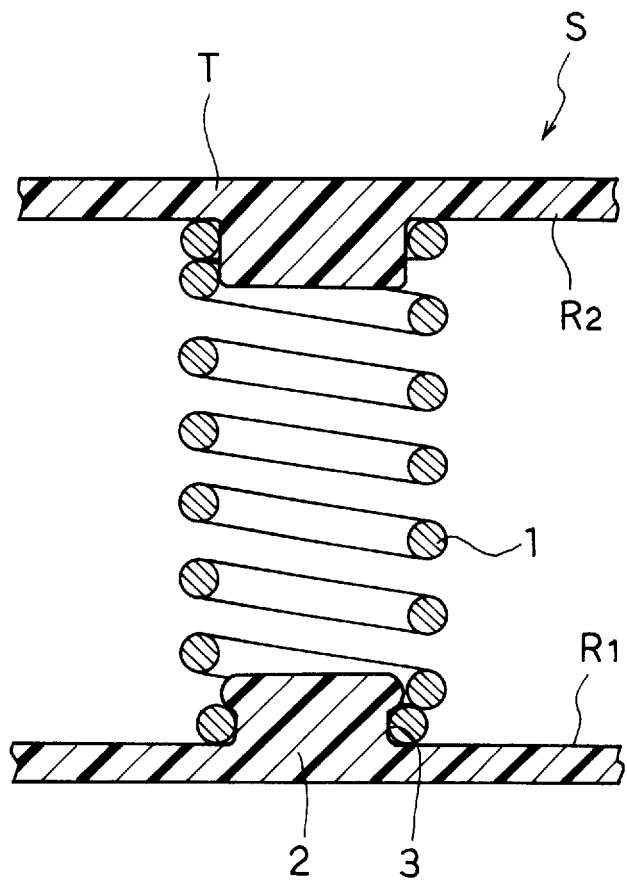
FIG. 3 is a partially sectional view of one of the coil springs in the spring assembly of a second embodiment.

Two kinds of protrusions, that is, the mounting portions 2 and the guide protrusions T, are disposed alternately circumferentially on each of the retainers R1, R2 in the first embodiment. The coil springs 1 are mounted on the mounting portions 2 of both retainers R1, R2 respectively. The retainers R1, R2 are then combined with each other such that the coil springs 1 are projected alternately from the retainers R1, R2. On the other hand, only the mounting portions 2 are formed on the retainer R1 and only the guide protrusions T are formed on the other retainer R2 in a second embodiment. As shown in FIG. 3, one ends of the coil springs 1 are fixed to the retainer R1 by heat caulking the mounting portions 2, whereby the coil springs 1 are projected from the retainer R1. In the second embodiment, the upper retainer R2 as viewed in FIG. 3 sometimes slips during transportation or the like. For the purpose of preventing this, it is desirable that each guide protrusion T should have a diameter larger than that shown in FIG. 1 so as to be in contact with the inner periphery of the coil spring 1.

Third Embodiment

Figure 4:
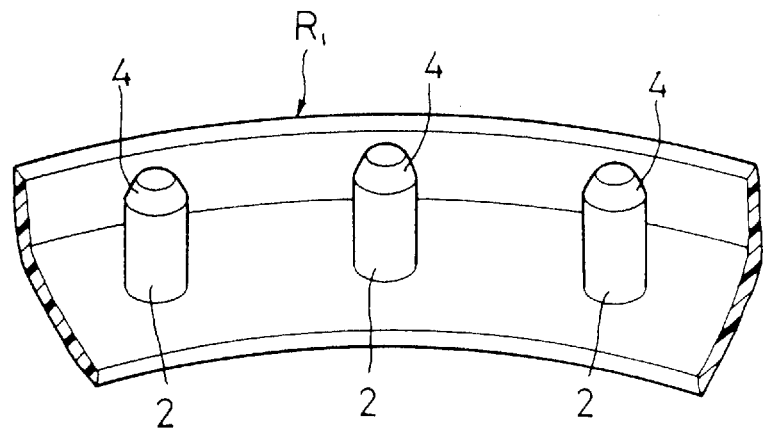
FIG. 4 is a partially perspective view of the spring assembly of a third embodiment.

FIG. 4 illustrates a third embodiment of the invention. In the third embodiment, a chamfer 4 is formed on a distal end of each mounting portion 2 over its entire circumference. Accordingly, the insertion of each coil spring 1 can be readily performed since the distal end of each mounting portion 2 is tapered.

Fourth Embodiment

Figure 5:
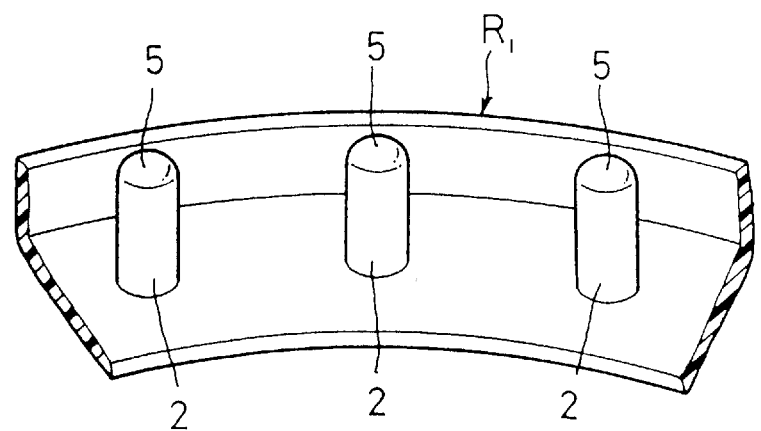
FIG. 5 is a partially perspective view of the spring assembly of a fourth embodiment.

In a fourth embodiment shown in FIG. 5, each mounting portion 2 has a spherical distal end 5. Consequently, the insertion of each coil spring 1 can also be performed

Fifth Embodiment

Figure 6:
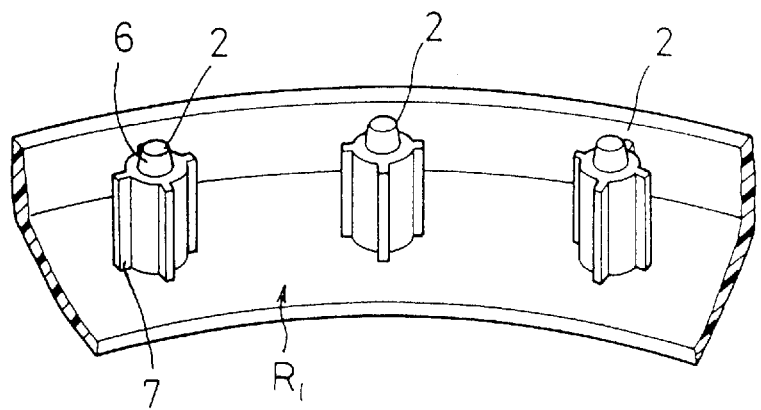
FIG. 6 is a partially perspective view of the spring assembly of a fifth embodiment.

FIG. 6 illustrates a fifth embodiment. Each mounting portion 2 has a small diameter portion 6 at the distal end and for example, four ribs 7 radially formed on the peripheral face to extend in the direction of its height. When each coil spring 1 is inserted, each rib 7 is elastically deformed so that its distal end is bent. Thus, the bending renders the insertion of each coil spring 1 easy and the fixation of each coil spring 1 secured. Although the ribs 7 in FIG. 5 are projected radially, they may be projected tangentially for further enhancement of the bending.

Sixth Embodiment

Figure 7:
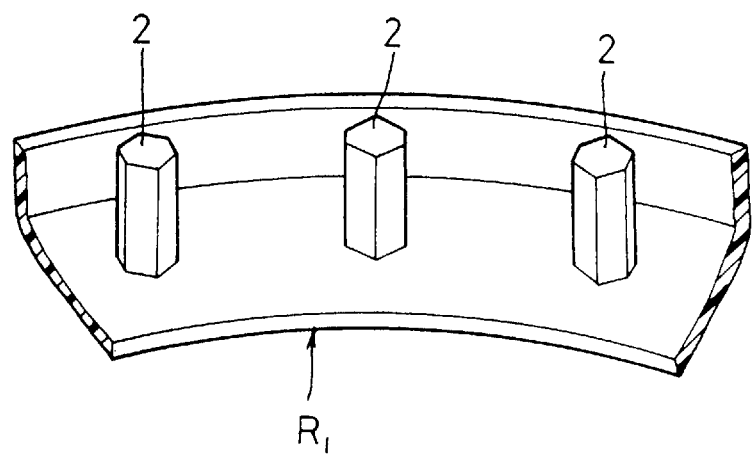
FIG. 7 is a a partially perspective view of the spring assembly of a sixth embodiment.

FIG. 7 illustrates a sixth embodiment. In the sixth embodiment, each mounting portion 2 is formed into the shape of a polygonal pole. Although FIG. 7 shows the mounting portion 2 formed into the shape of a hexagonal pole, it may be formed into the shape of another polygonal pole such as a triangle, square or pentagonal pole.

Seventh Embodiment

Figure 8:
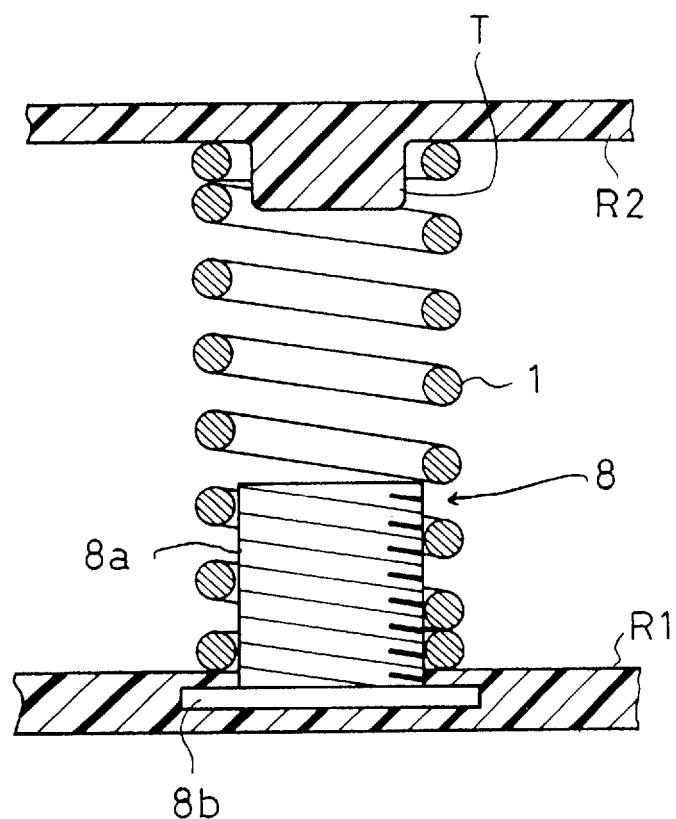
FIG. 8 is a partially sectional view of one of coil springs disposed between the spring retainers in the spring assembly of a seventh embodiment.

In a seventh embodiment shown in FIG. 8, a plurality of metal screws 8 are integrally provided on each retainer by way of an insert molding so as to serve as the mounting portion 2. Each metal screw 8 includes a shaft portion 8a having a helical groove and an integral flat head portion 8b. Instead of the screws 8, a plurality of pins allowing the coil spring to be press fitted may be provided by way of the insert molding so as to serve as the mounting portion.

Eighth Embodiment

Figure 9:
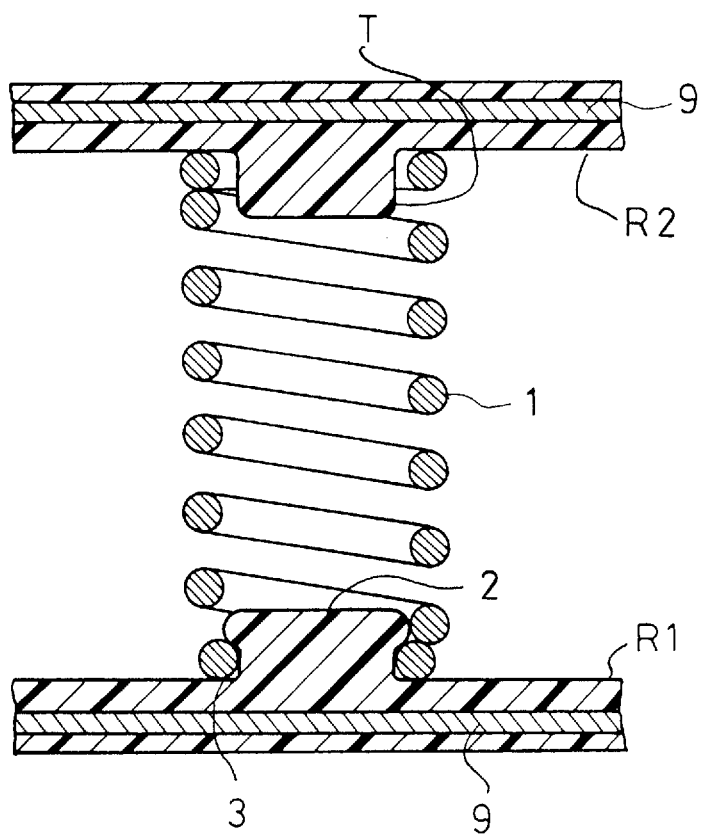
FIG. 9 is a view similar to FIG. 7 illustrating the spring assembly of an eighth embodiment.

In the construction shown in FIG. 9 as an eighth embodiment, a reinforcing metal sheet 9 is integrally provided in each retainer by way of the insert molding. A plurality of arcuate reinforcing sheets may be provided at predetermined intervals in each retainer instead of the ring-shaped reinforcing metal sheets.

Ninth Embodiment

Figure 10:
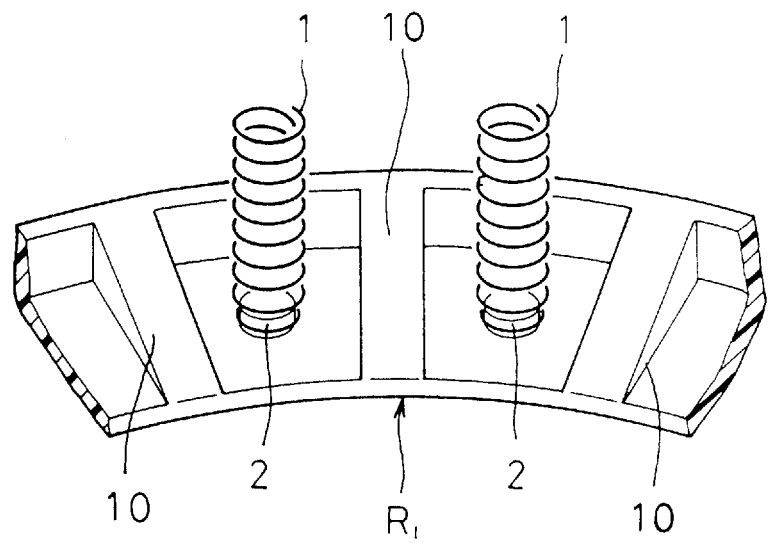
FIG. 10 is a partially perspective view of the spring assembly of a ninth embodiment.

FIG. 10 illustrates a ninth embodiment of the invention. Reinforcing projections 10 are radially formed between the coil springs 1 on the circumferential face of each of the retainers R1, R2. This construction improves the strength of each retainer and prevents the thickness of each retainer from being unnecessarily increased. This effect is remarkable when the spring assembly of this embodiment is applied to that of the brake type which type tends to lack in the durability.

Tenth Embodiment

Figure 11:
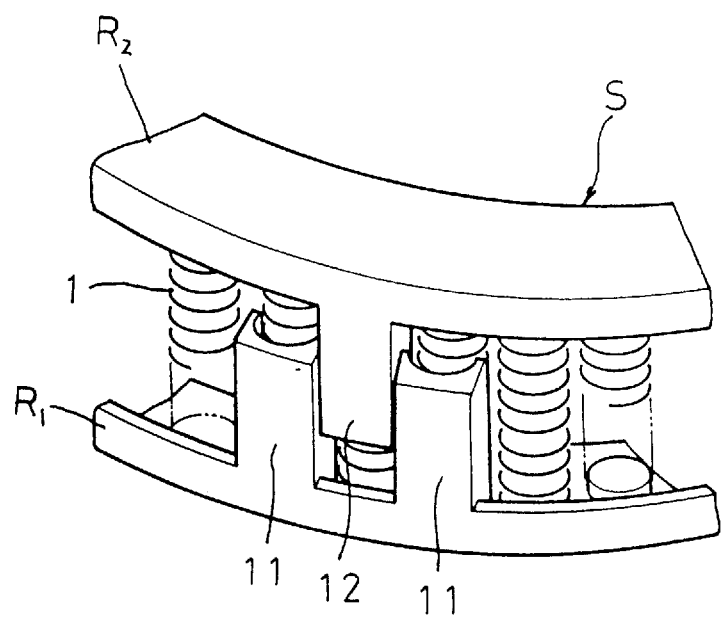
FIG. 11 is a partially perspective view of the spring assembly of a tenth embodiment.

FIG. 11 illustrates a tenth embodiment. The spring assembly of the tenth embodiment is provided with distortion preventing means. A pair of first distortion preventing pieces 11 serving as the distortion preventing means are formed on the outer peripheral edge of the first retainer R1 to be projected toward the side of the second retainer R2. The first distortion preventing pieces 11 are positioned so as to correspond to two coil springs 1 at both sides of the three coil springs 1 disposed in sequence. These first distortion preventing pieces 11 are integrally formed so as to stand from the outer peripheral edge of the first retainer R1. The inner side of each first distortion preventing piece 11 is curved so as to cover half round the corresponding coil spring 1. Accordingly, each first distortion Preventing piece 11 also serves to guide expansion and contraction of the corresponding coil spring 1. On the other hand, a second distortion preventing piece 12 also serving as the distortion preventing means extends from the second retainer R2 to be interposed between the first distortion preventing pieces 11. The second distortion preventing piece 12 also has a curved inner side covering half round the corresponding coil spring 1 in the same manner as in the first distortion preventing pieces 11 though that is not shown in FIG. 11. Two distortion preventing means comprising the first and second distortion preventing pieces 11, 12 are disposed symmetrically on the spring assembly S, for example.

When the spring assembly S of the tenth embodiment is incorporated into the automatic transmission mechanism, the first and second distortion preventing pieces 11, 12 are provided so as to be overlapped each other in the direction of their heights and so that no gap is circumferentially left between them.

In accordance with the tenth embodiment, both distortion preventing pieces 11, 12 are engaged with each other such that the angular displacement between the retainers R1, R2 can be prevented. Furthermore, since the first and second distortion preventing pieces 11, 12 can be formed integrally with the first and second retainers R1, R2 respectively, a special work for the provision of the distortion preventing means is not required though this work is required in the prior art. Consequently, reduction in the manufacturing cost and improvement of the manufacturing efficiency can be expected.

Eleventh Embodiment

FIG. 12 illustrates an eleventh embodiment. The invention is applied to the spring assembly S having a single retainer R in the eleventh embodiment. In this type of spring assembly in which the free end side of each coil spring is engaged with the counterpart, it is difficult to maintain each coil spring at the attitude perpendicular to the retainer and the buckling tends to be caused during operation of the spring assembly. To overcome these disadvantages, cylindrical guide members 13 are formed on the peripheral face of the retainer R. The coil springs 1 are inserted in the guide members 13 at a predetermined level respectively. The mounting portions 2 are formed on the inner bottom of the guide members 13 respectively.

In the eleventh embodiment, the guide members 13 prevent the respective coil spring 1 from bending and falling, thereby holding them in the normal attitude. Consequently, the load applied to the counterpart by the coil springs 1 can be stably maintained at a preselected value.

Twelfth Embodiment

Figure 13:
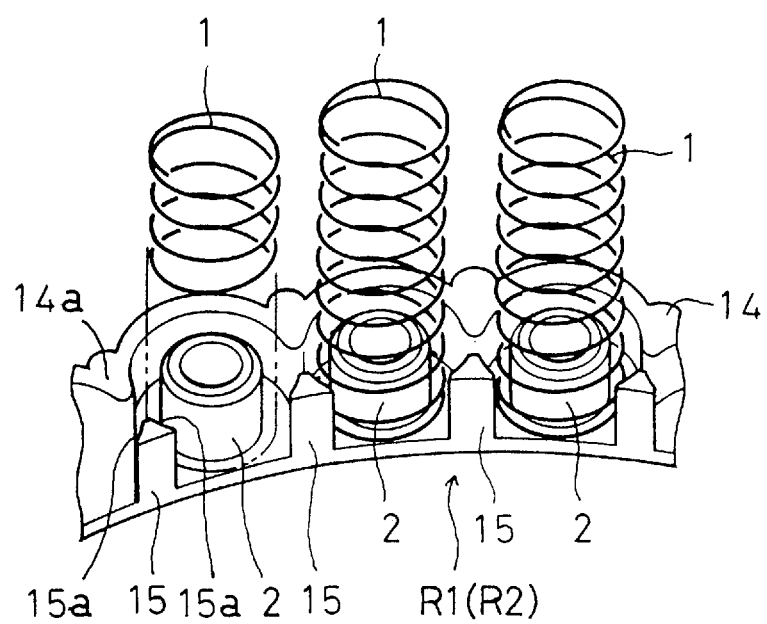
FIG. 13 is a partially perspective view of the spring assembly of a twelfth embodiment.
Figure 14:
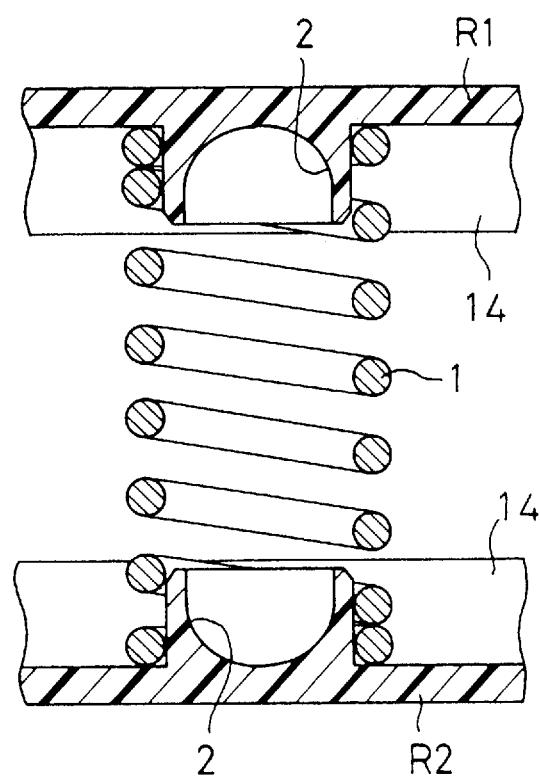
FIG. 14 is a partially sectional view of one of coil springs disposed between the retainers in the spring assembly of the twelfth embodiment.

FIGS. 13 and 14 illustrate a twelfth embodiment. The retainers R1, R2 are formed from the synthetic resin into the ring shape. The mounting portions 2 are formed on one side face of each retainer at the predetermined intervals for mounting a plurality of coil springs 1 respectively. Each mounting portion 2 is formed into a generally cylindrical shape and has a diameter larger than the inner diameter of the coil spring 1 so that the coil spring 1 can be elastically engaged with the mounting portion 2. Consequently, each coil spring 1 is fitted to the outer periphery of the mounting portion 2 by the elastically expansive force of the mounting portion 2 to be fixed in position. Although each mounting portion 2 is cylindrical, it may be prismatic.

A wall 14 is formed outside the cylindrical mounting portions 2 on the outer periphery of each retainer to be concentric with and to be spaced from the mounting portion 2. The wall 14 has circularly arcuate portions formed at the interval corresponding to the wire diameter of the coil spring 1 extending continuously over the whole circumference of the retainer such that the wall 14 is formed into a corrugated shape. The wall 14 has a height larger than the retainers R1, R2. Alternatively, the wall 14 may be positioned on the inner peripheral side of the retainer or between each coil spring 1 and the adjacent one.

A projection 15 generally having the shape of a triangle pole is formed on the inner peripheral side of each retainer so as to be positioned between each coil spring 1 and the adjacent one. One of three vertexes of each projection 15 is directed toward each ridge portion 14a of the wall 14 formed on the outer peripheral side of each retainer. Each projection 15 has left-hand and right-hand sides 15a between which the vertex is Positioned. These sides 15a are engageable with the outer periphery of the adjacent coil spring 1.

In accordance with the twelfth embodiment, the mounting portions 2 for mounting the coil springs 1 are integrally formed on each of the retainers R1, R2. The wall 14 is formed outside the cylindrical mounting portions 2 on the outer periphery of each retainer to be concentric with the mounting portion 2 and to have the circularly arcuate portions extending continuously over the whole circumference of the retainer. Accordingly, the retainers R1, R2 are reinforced by the respective walls 14 and distortion of each retainer can be prevented. Consequently, the thickness of each retainer can be reduced. Furthermore, the distortion at the inner peripheral side of each retainer can be prevented by the projections 15 formed on the inner peripheral side of each retainer at the predetermined intervals. Consequently, each retainer can be maintained in the stable planarity and the seating of the coil springs 1 can be rendered stable.

Furthermore, each mounting portion 2 is formed into the cylindrical shape and has a diameter larger than the inner diameter of the coil spring 1 so that the coil spring 1 can be elastically engaged with the mounting portion 2. Consequently, the coil springs 1 can be readily fitted to the outer periphery of the mounting portions 2 respectively and the resin mold can be performed advantageously. Additionally, the status of the coil springs 1 fitted to the respective mounting portions 2 can be stabilized and secured, which ensures linearity of the telescopic motion of each coil spring 1.

Thirteenth Embodiment

Figure 15:
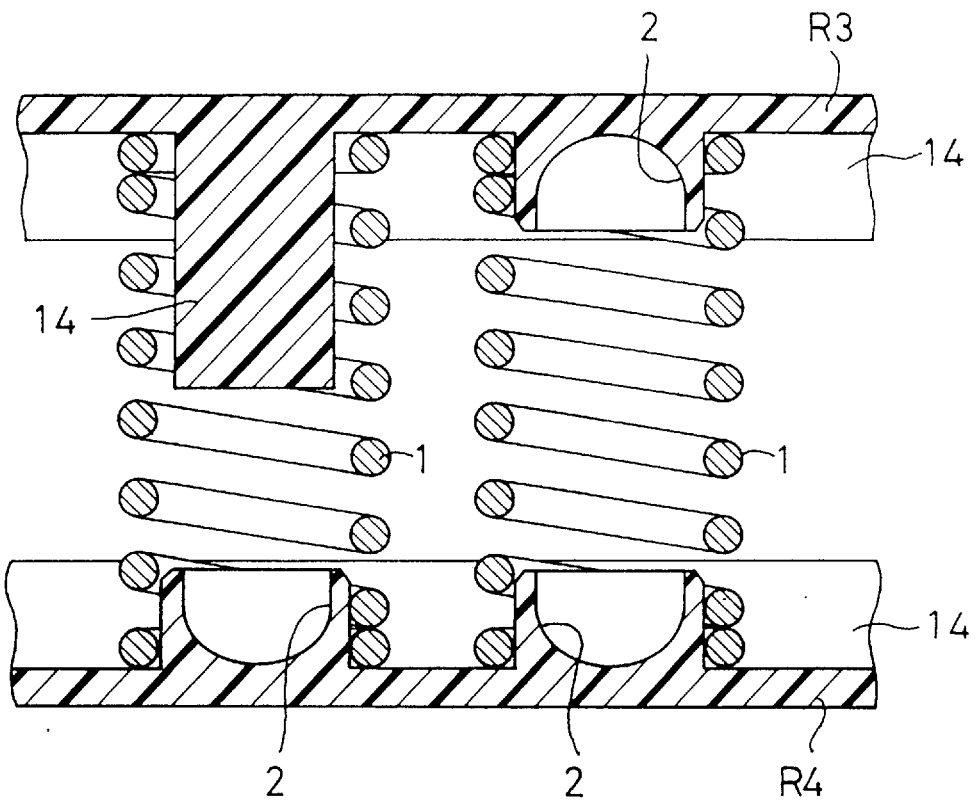
FIG. 15 is a partially sectional view of the coil springs in the spring assembly of a thirteenth embodiment.
Figure 16:
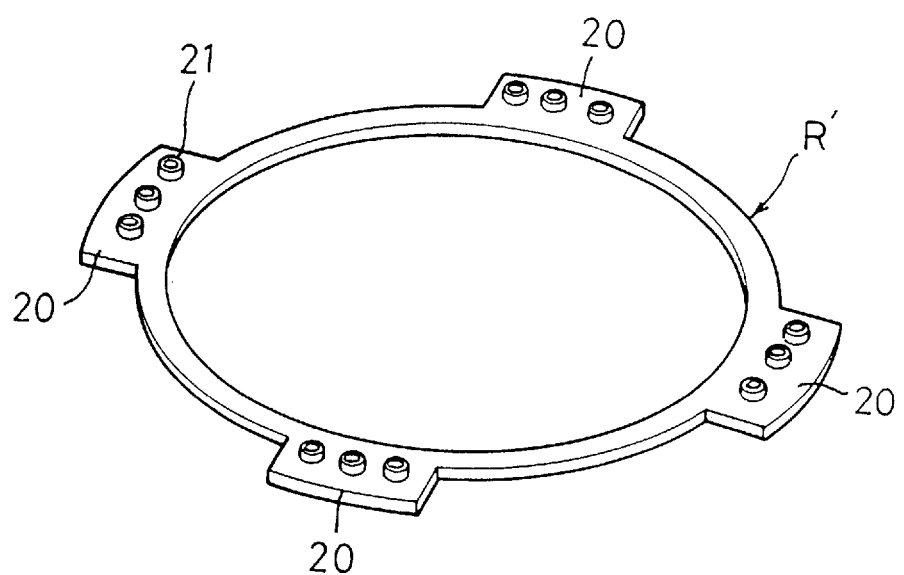
FIG. 16 is a perspective view of the retainer employed in the prior art spring assembly.

FIG. 15 illustrates a thirteenth embodiment. Instead of the cylindrical mounting portions 2 occupying the 120 degree position, for example, a guide protrusion 16 with a predetermined length is formed on either retainer and the end of the coil spring 1 fitted to the mounting portion 2 of the other retainer is fitted to the guide protrusion 16. The other construction is the same as described above.

The guide protrusion 16 can effectively prevent the relative angular displacement caused between the retainers R1, R2, whereby the coil springs 1 can be prevented from bending and falling and held in the normal attitude. Consequently, the load applied to the counterpart by the coil springs 1 can be stably maintained at a preselected value.

Although the spring assembly of the invention is applied to that of the clutch type in the foregoing embodiments, it may be applied to the spring assembly of the brake type and the same effect can be achieved in the brake type spring assembly as in that of the clutch type.

The foregoing disclosure and drawings are merely illustrative of the principles of the present invention and are not to be interpreted in a limiting sense. The only limitation is to be determined from the scope of the appended claims.

We claim:

1. A spring assembly for an automatic transmission comprising:

a) a pair of generally ring-shaped spring retainers each formed from a synthetic resin material, each of said spring retainers including an annular non-perforated base;

b) a plurality of mounting protrusions circumferentially formed on each spring retainer wherein each mounting protrusion has at least one adjacent mounting protrusion;

c) a plurality of guide protrusions circumferentially formed on each spring retainer wherein each of the guide protrusions is positioned between a respective one of the mounting protrusions and one of its adjacent at least one mounting protrusion; and d) a plurality of coil springs wherein:

each coil spring includes a first end and a second end;

each coil spring has its first end mounted on the base of, and around one of the plurality of mounting protrusions on, one of the spring retainers and its second end mounted on the base of, and around one of the plurality of guide protrusions on, the other of the spring retainers.

2. A spring assembly for an automatic transmission comprising:

a) a pair of generally ring-shaped spring retainers each formed from a synthetic resin material, each of said spring retainers including a non-perforated base;

b) a plurality of mounting protrusions circumferentially formed on either spring retainer;

c) a plurality of guide protrusions circumferentially formed on the spring retainer that does not have mounting protrusions; and d) a plurality of coil springs each of which has two ends and wherein one end of each coil spring is mounted on the base of, and around one of the mounting protrusions of, the spring retainer and the other end is fitted to a guide protrusion of the other spring retainer.

3. A spring assembly according to claim 1 or 2, wherein each of the coil springs is fitted to its respective guide protrusion and is in contact with the outer periphery of the respective guide protrusion.

4. A spring assembly according to claim 1 or 2, further comprising angular displacement preventing projections formed on each spring retainer so as to inhibit angular displacement between the two spring retainers, wherein each angular displacement preventing projection of one of the spring retainers is interposed between at least two angular displacement preventing projections of the other spring retainer.

5. A spring assembly according to claim 1 or 2, wherein projected pieces are integrally formed on the peripheral face of each spring retainer so as to be placed between each coil spring and the adjacent coil spring for reinforcing each spring retainer.

* * * * *